(12) United States Patent
Jung et al.

(10) Patent No.: US 12,489,123 B2
(45) Date of Patent: Dec. 2, 2025

(54) HYDROGEN RECIRCULATION EJECTOR FOR FUEL CELLS

(71) Applicant: HONGSWORKS Co., Ltd., Incheon (KR)

(72) Inventors: Ji Hong Jung, Seoul (KR); Seok Keun Hong, Chuncheon-si (KR); Hun Hee Kim, Seoul (KR)

(73) Assignee: HONGSWORKS CO., LTD., Incheon (KR)

( * ) Notice: Subject to any disclaimer, the term of this patent is extended or adjusted under 35 U.S.C. 154(b) by 577 days.

(21) Appl. No.: 17/968,014

(22) Filed: Oct. 18, 2022

(65) Prior Publication Data

US 2023/0238550 A1 Jul. 27, 2023

(30) Foreign Application Priority Data

Jan. 25, 2022 (KR) .......................... 10-2022-0010686

(51) Int. Cl.
*B01F 25/312* (2022.01)
*B01F 23/10* (2022.01)
*B05B 7/00* (2006.01)
*H01M 8/04082* (2016.01)
*H01M 8/04089* (2016.01)
(Continued)

(52) U.S. Cl.
CPC ......... *H01M 8/04097* (2013.01); *B01F 23/19* (2022.01); *B01F 25/31243* (2022.01); *B01F 25/31252* (2022.01); *B05B 7/0075* (2013.01); *B01F 2101/59* (2022.01)

(58) Field of Classification Search
CPC ..... H01M 8/04097; H01M 2008/1095; H01M 2250/20; H01M 8/04201; B01F 23/19; B01F 25/31243; B01F 25/31252; B01F 2101/59; B01F 23/10; B01F 25/31242; B01F 25/3125; B05B 7/0075;
(Continued)

(56) References Cited

U.S. PATENT DOCUMENTS 9,285,146 B2 * 3/2016 Liu .......................... F25B 49/02
2002/0106547 A1 * 8/2002 Sugawara ......... H01M 8/04097
417/189
(Continued)

FOREIGN PATENT DOCUMENTS

KR 1020110109378 A 10/2011

*Primary Examiner* — Christian Roldan
(74) *Attorney, Agent, or Firm* — Rabin & Berdo, P.C.

(57) ABSTRACT

Disclosed is a hydrogen recirculation ejector for fuel cells including a recirculation line configured to recirculate residual hydrogen gas discharged from a fuel cell stack configured to generate electricity using air and hydrogen gas supplied thereto to an inlet of the fuel cell stack and an ejector including a nozzle installed on the recirculation line, the nozzle being configured to supply new hydrogen gas, a venturi tube configured to mix the hydrogen supplied from the nozzle and the recirculated hydrogen with each other, and a diffuser configured to supply the mixed hydrogen gas to the fuel cell stack, wherein the nozzle includes a hydrogen introduction portion, a ring-shaped inner wall, a ring-shaped outer wall, a ring-shaped front end wall, and a ring-shaped rear end wall, and wherein the thickness of the inner wall and/or the outer wall is gradually increased with increasing distance from the hydrogen introduction portion.

6 Claims, 7 Drawing Sheets

(51) Int. Cl.
*H01M 8/10* (2016.01)
*B01F 101/59* (2022.01)

(58) Field of Classification Search
CPC ..... B05B 1/044; B05B 1/06; B05B 7/241; Y02E 60/50; B22F 5/10; B33Y 10/00; F16K 15/00
USPC ........................................................ 429/415
See application file for complete search history.

(56) References Cited

U.S. PATENT DOCUMENTS

2008/0199746 A1* 8/2008 Kobayashi ................ F04F 5/16
429/430
2009/0155092 A1* 6/2009 Fukuma ............ H01M 8/04104
429/513

* cited by examiner

HYDROGEN RECIRCULATION EJECTOR FOR FUEL CELLS

This application claims the benefit of Korean Patent Application No. 10-2022-0010686, filed on Jan. 25, 2022, which is hereby incorporated by reference as if fully set forth herein.

BACKGROUND OF THE INVENTION

Field of the Invention

The present invention relates to a hydrogen recirculation ejector for fuel cells, and more particularly to a hydrogen recirculation ejector for fuel cells configured such that an airfoil-structured nozzle is provided, hydrogen is ejected at a high speed while passing through the airfoil-structured nozzle, whereby low pressure is formed, recirculated hydrogen introduced into a nozzle chamber due to pressure difference is mixed with the hydrogen ejected from the nozzle, and the mixture is supplied to a fuel cell stack via a venturi tube and a diffuser.

Discussion of the Related Art

Hydrogen necessary for battery reaction is continuously supplied to a fuel cell stack; however, less than 100% of the supplied hydrogen performs chemical reaction in the fuel cell stack. For this reason, it is necessary to supply more than the amount of hydrogen necessary for battery reaction to the fuel cell stack.

In order to improve system efficiency, residual hydrogen in the fuel cell stack after battery reaction is supplied to the fuel cell stack through recirculation. In order to recirculate the hydrogen, a hydrogen recirculation ejector configured to increase the pressure of surplus hydrogen having pressure reduced while passing through the fuel cell stack such that the hydrogen is recirculated to the fuel cell stack is used.

The ejector ejects high-pressure hydrogen using a nozzle to greatly reduce the pressure of a chamber, in which the high-pressure hydrogen is mixed with recirculated gas, such that surplus hydrogen in the fuel cell stack is introduced into the chamber as the recirculated gas, the surplus hydrogen is mixed with pure hydrogen supplied through the nozzle, and the mixture is supplied to an inlet of the fuel cell stack.

The ejector is provided with a check valve. The check valve allows the recirculated gas, including the surplus hydrogen, from the fuel cell stack to flow toward only the ejector and prevents the flow of the gas in an opposite direction, thereby preventing backward flow of the hydrogen gas into a recirculation intake of the ejector at the time of gas purge of a fuel cell hydrogen supply system or at the time of abnormal operation of a vehicle.

Korean Patent Application Publication No. 10-2011-0109378 (2011 Oct. 6) may be referred to as a prior art document.

The hydrogen recirculation ejector has a simpler structure than a blow type ejector, does not need to be lubricated, since the hydrogen recirculation ejector has no operation part, has high resistance to noise and vibration, is easily and simply maintained, has a long lifespan, and exhibits excellent cold start characteristics.

However, the recirculation rate of the hydrogen recirculation ejector in a low load/high load area is low. When the hydrogen recirculation ejector is independently used in a fuel cell vehicle having a wide operation range, therefore, efficiency of the hydrogen recirculation ejector is greatly reduced.

SUMMARY OF THE INVENTION

It is an object of the present invention to provide a hydrogen recirculation ejector for fuel cells configured such that a nozzle configured to eject hydrogen is formed so as to have an airfoil structure, whereby it is possible to improve hydrogen recirculation performance in the entire output area of a fuel cell system and to achieve higher hydrogen supply efficiency than conventionally.

Objects of the present invention are not limited to the aforementioned object, and other unmentioned objects will be clearly understood by those skilled in the art based on the following description.

In accordance with an aspect of the present invention, the above and other objects can be accomplished by the provision of a hydrogen recirculation ejector for fuel cells, the hydrogen recirculation ejector including a recirculation line configured to recirculate residual hydrogen gas discharged from a fuel cell stack configured to generate electricity using air and hydrogen gas supplied thereto to an inlet of the fuel cell stack and an ejector including a nozzle installed on the recirculation line, the nozzle being configured to supply new hydrogen gas, a venturi tube configured to mix the hydrogen supplied from the nozzle and the recirculated hydrogen with each other, and a diffuser configured to supply the mixed hydrogen gas to the fuel cell stack, wherein the nozzle includes a hydrogen introduction portion configured to allow hydrogen supplied from a hydrogen tank to be introduced into the nozzle therethrough, a ring-shaped inner wall provided so as to define a bore configured to eject hydrogen, a ring-shaped outer wall spaced apart from the inner wall in an outward direction, the outer wall being provided so as to define a hydrogen flow path configured to allow the hydrogen introduced through the hydrogen introduction portion to flow therealong, a ring-shaped front end wall provided so as to connect front ends of the inner wall and the outer wall to each other, the front end wall being configured to block a front end of the hydrogen flow path, and a ring-shaped rear end wall extending from a rear end of the outer wall to the front end of the inner wall, the rear end wall being provided such that a hydrogen ejection port is defined between the rear end wall and the inner wall, and wherein the thickness of at least one of the inner wall and the outer wall is gradually increased with increasing distance from the hydrogen introduction portion such that the sectional area of the hydrogen flow path is gradually reduced with increasing distance from the hydrogen introduction portion.

The thickness of the inner wall may be gradually increased in a direction toward the outer wall with increasing distance from the hydrogen introduction portion.

The thickness of the outer wall may be gradually increased in a direction toward the inner wall with increasing distance from the hydrogen introduction portion.

In addition, the thicknesses of the inner wall and the outer wall may be gradually increased toward each other with increasing distance from the hydrogen introduction portion.

The nozzle may be inserted into and installed in an inlet of the venturi tube.

The venturi tube may be provided at the inlet thereof with a plurality of recirculated hydrogen introduction holes configured to allow the recirculated hydrogen to be introduced into the venturi tube therethrough.

The recirculated hydrogen introduction holes may be disposed around the inlet of the venturi tube at equal intervals.

The nozzle may be manufactured by three-dimensional (3D) printing.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, preferred embodiments of the present invention will be described in detail with reference to the accompanying drawings. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method.

Accordingly, embodiments described in this specification and constructions shown in the drawings are merely the most preferred embodiment of the present invention and do not speak for the entirety of the technical idea of the present invention, and therefore it should be understood that various replaceable equivalents and modifications may be possible at the time of filing the present application.

The present invention relates to a hydrogen recirculation ejector 100 for fuel cells configured such that an airfoil-structured nozzle 110 is provided, hydrogen is ejected at a high speed while passing through the airfoil-structured nozzle 110, whereby low pressure is formed, recirculated hydrogen introduced into a nozzle chamber 120 due to pressure difference is mixed with the hydrogen ejected from the nozzle 110, and the mixture is supplied to a fuel cell stack 10 via a venturi tube 130 and a diffuser 140. Hereinafter, a hydrogen recirculation ejector 100 for fuel cells according to an embodiment of the present invention will be described with reference to the accompanying drawings.

Referring to FIGS. 1 to 6, the hydrogen recirculation ejector 100 for fuel cells according to the embodiment of the present invention includes a recirculation line 20 configured to recirculate residual hydrogen gas discharged from a fuel cell stack 10 configured to generate electricity using air and hydrogen gas supplied thereto to an inlet of the fuel cell stack 10.

Figure 1:
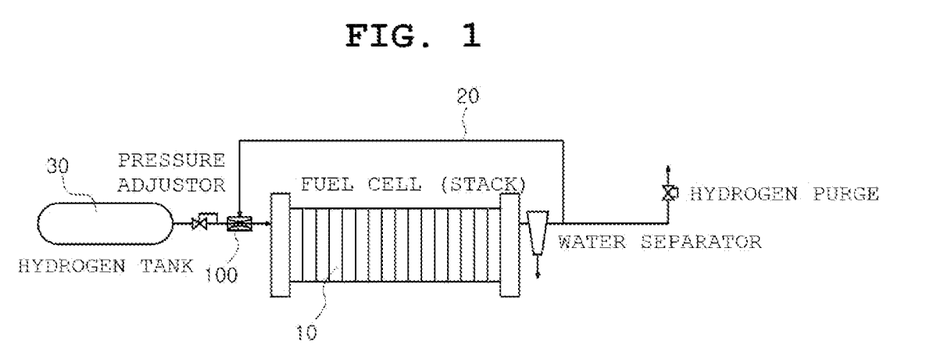
FIG. 1 is a reference view showing a hydrogen supply device.
Figure 2:
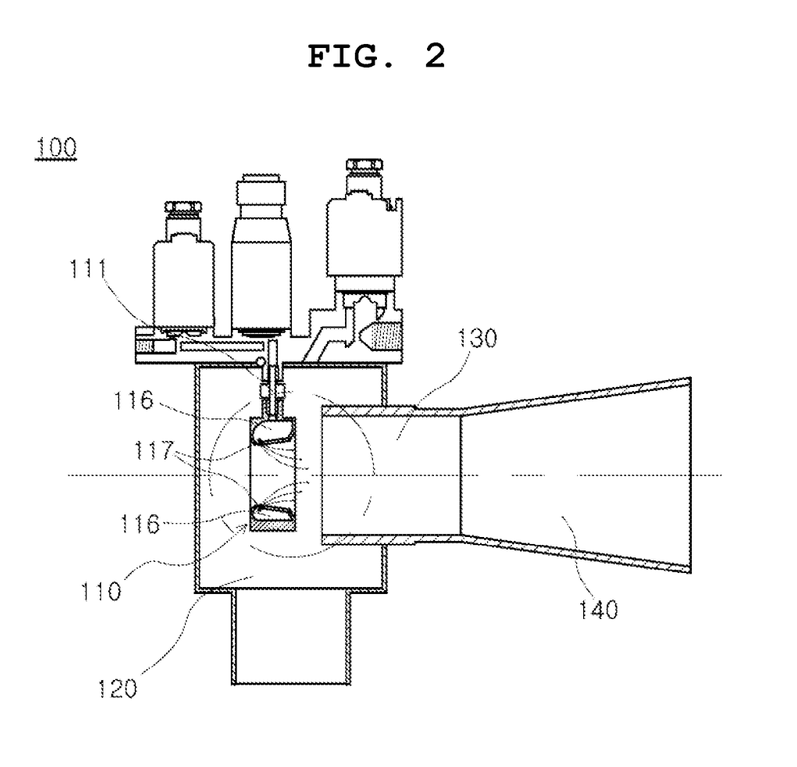
FIG. 2 is a reference view showing a hydrogen recirculation ejector for fuel cells according to an embodiment of the present invention.

The hydrogen recirculation ejector 100 for fuel cells according to the embodiment of the present invention further includes a nozzle 110 installed on the recirculation line 20, the nozzle 110 being configured to supply new hydrogen gas, a venturi tube 130 configured to mix the hydrogen supplied from the nozzle 110 and the recirculated hydrogen with each other, and a diffuser 140 configured to supply the mixed hydrogen gas to the fuel cell stack 10.

Figure 3:
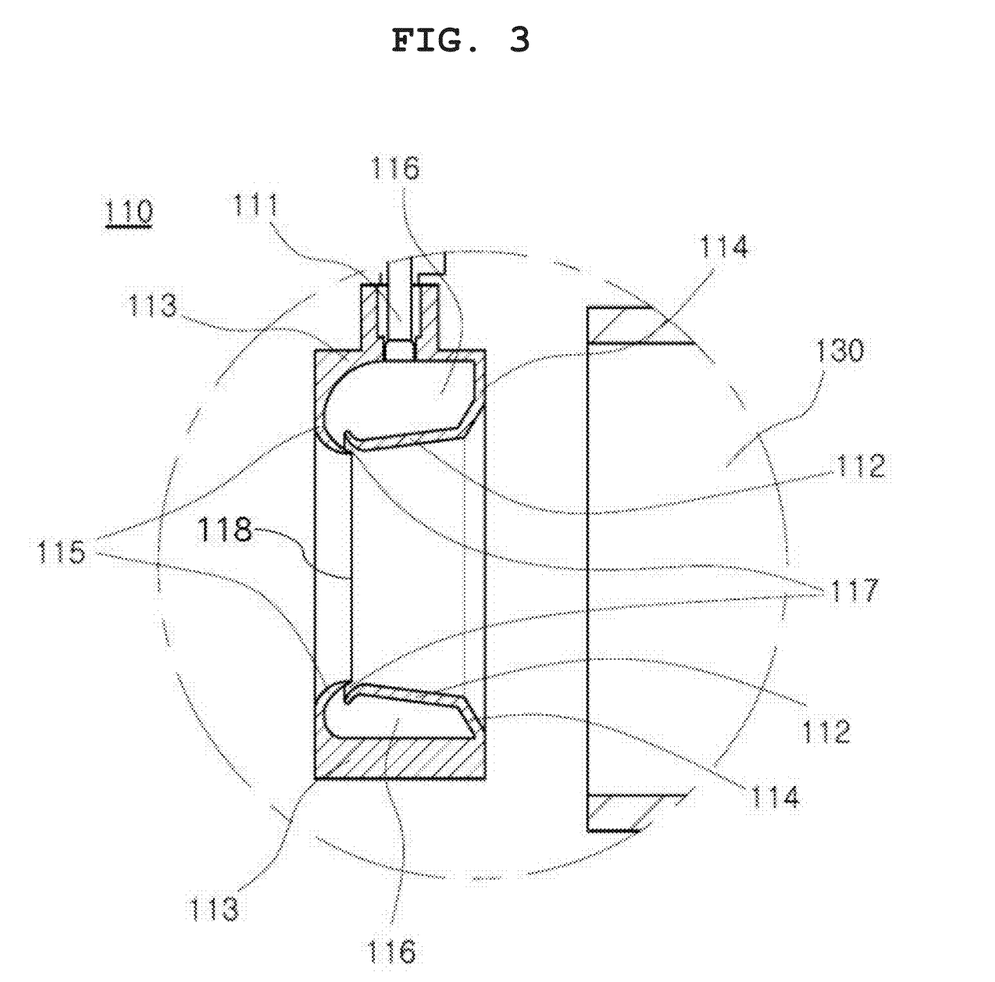
FIG. 3 is a reference view showing a nozzle, which is an important part of the hydrogen recirculation ejector for fuel cells according to the embodiment of the present invention.

Hereinafter, a nozzle 110 according to an embodiment of the present invention will be described in more detail. The nozzle 110 includes a hydrogen introduction portion 111, a ring-shaped (or annular) inner wall 112, a ring-shaped outer wall 113, a ring-shaped front end wall 114, and a ring-shaped rear end wall 115. Hydrogen supplied from a hydrogen tank 30 is introduced into the nozzle 110 through the hydrogen introduction portion 111.

The ring-shaped inner wall 112 defines a bore 118 configured to eject hydrogen, and the ring-shaped outer wall 113 is spaced apart from the ring-shaped inner wall 112 in an outward direction. The ring-shaped outer wall 113 defines a hydrogen flow path 116 configured to allow the hydrogen introduced through the hydrogen introduction portion 111 to flow therealong.

The ring-shaped front end wall 114 connects front ends of the inner wall 112 and the outer wall 113 to each other and blocks a front end of the hydrogen flow path 116.

The ring-shaped rear end wall 115 extends from a rear end of the outer wall 113 to the front end of the inner wall 112. A hydrogen ejection port 117 is defined between the ring-shaped rear end wall 115 and the ring-shaped inner wall 112.

As the result of the nozzle 110 according to the embodiment of the present invention being configured as described above, the nozzle 110 has an airfoil structure. Hydrogen is ejected at a high speed while passing through the airfoil-structured nozzle 110, whereby low pressure is formed, recirculated hydrogen introduced into the nozzle chamber 120 due to pressure difference is mixed with the hydrogen ejected from the nozzle 110, and the mixture is supplied to the fuel cell stack 10 via the venturi tube 130 and the diffuser 140.

Here, it is preferable for the thickness of at least one of the inner wall 112 and the outer wall 113 to be gradually increased with increasing distance from the hydrogen introduction portion 111 such that the sectional area of the hydrogen flow path 116 is gradually reduced with increasing distance from the hydrogen introduction portion 111.

It is preferable for the nozzle 110 according to the embodiment of the present invention to be manufactured by three-dimensional (3D) printing. The ring-shaped inner wall 112 is printed so as to define the bore 118 configured to eject hydrogen, and the ring-shaped outer wall 113 is printed so as to be spaced apart from the inner wall 112 in the outward direction.

The ring-shaped front end wall 114 is printed so as to connect the inner wall 112 and the outer wall 113 to each other, and the ring-shaped rear end wall 115 extends from the rear end of the outer wall 113 to the front end of the inner wall 112. The hydrogen ejection port 117 is defined between the ring-shaped rear end wall 115 and the ring-shaped inner wall 112.

In the nozzle 110, therefore, the hydrogen flow path 116, along which the hydrogen introduced through the hydrogen introduction portion 111 flows, is defined by the inner wall 112, the outer wall 113, the front end wall 114, and the rear end wall 115, and the hydrogen that flows along the hydrogen flow path 116 is ejected to the venturi tube 130 through the hydrogen ejection port 117.

At this time, the pressure of the ejected hydrogen is reduced by Bernoulli's principle, whereby the hydrogen flows at an increased flow speed. The hydrogen is mixed with the recirculated hydrogen introduced into the nozzle chamber 120 by pressure difference, and the mixture is supplied to the fuel cell stack 10 via the venturi tube 130 and the diffuser 140.

Figure 4:
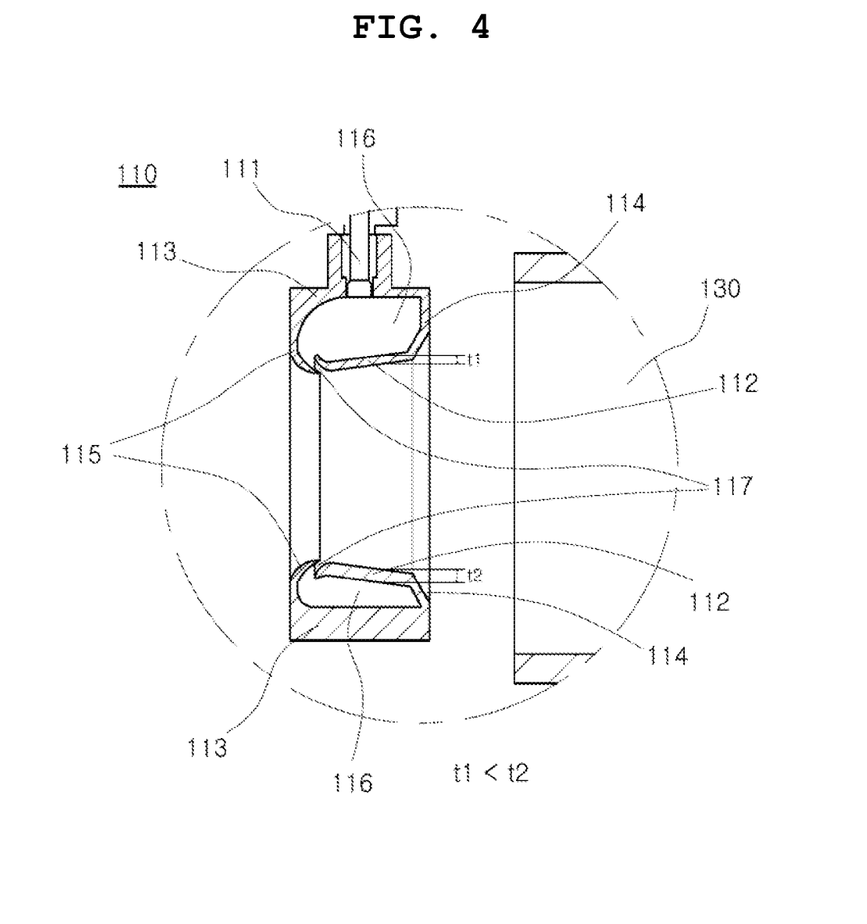
FIG. 4 is a reference view showing the state in which the thickness of an inner wall of a nozzle according to an embodiment of the present invention is gradually increased in a direction toward an outer wall of the nozzle with increasing distance from a hydrogen introduction portion.
Figure 5:
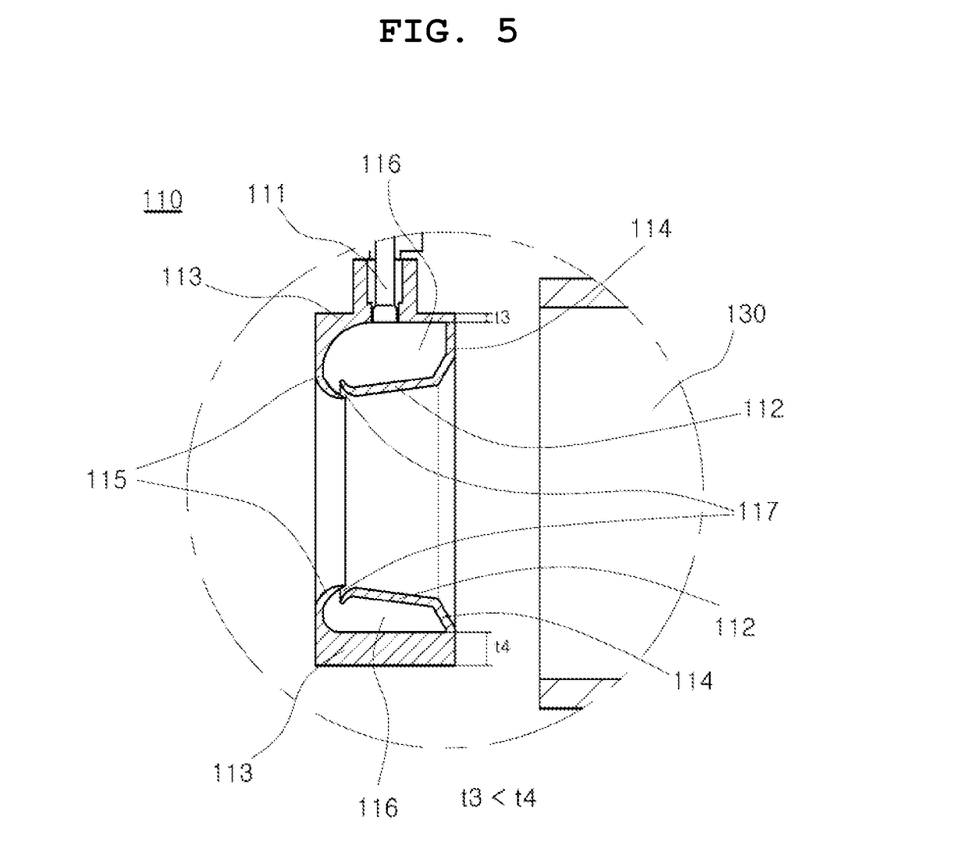
FIG. 5 is a reference view showing the state in which the thickness of the outer wall of the nozzle according to the embodiment of the present invention is gradually increased in a direction toward the inner wall of the nozzle with increasing distance from the hydrogen introduction portion.
Figure 6:
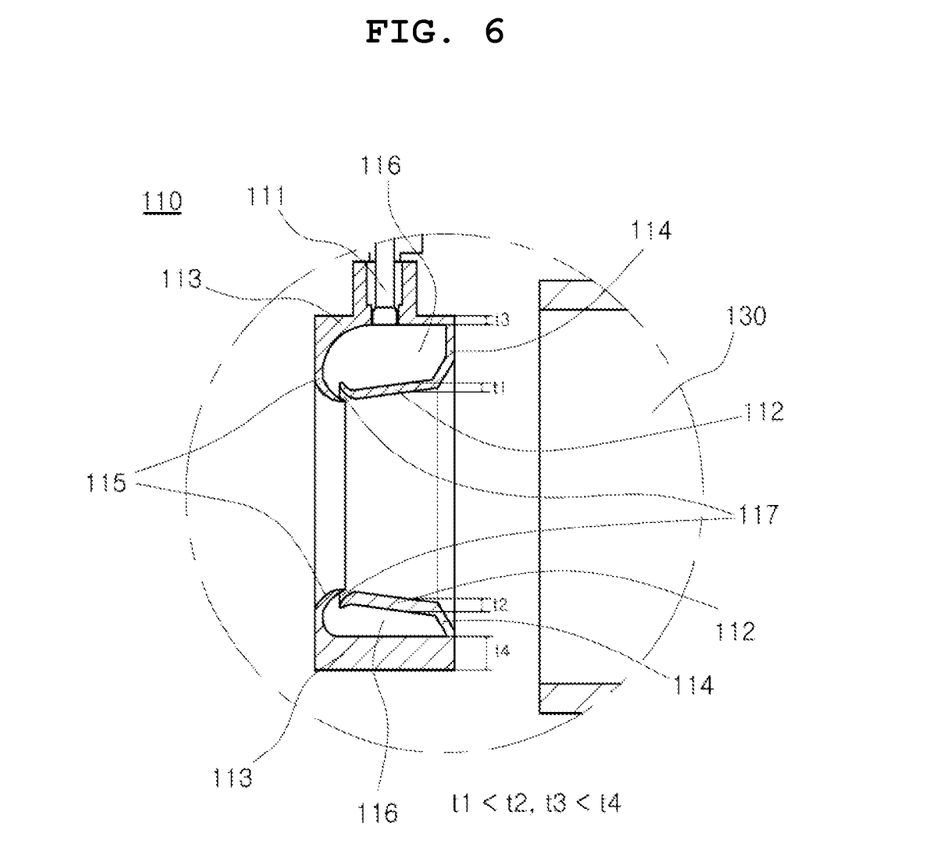
FIG. 6 is a reference view showing the state in which the thicknesses of the inner wall and the outer wall of the nozzle according to the embodiment of the present invention are gradually increased toward each other with increasing distance from the hydrogen introduction portion.

In order to improve hydrogen supply efficiency, the nozzle 110 may be formed such that the thickness of the inner wall 112 is gradually increased in a direction toward the outer wall 113 with increasing distance from the hydrogen introduction portion 111, such that the thickness of the outer wall 113 is gradually increased in a direction toward the inner wall 112 with increasing distance from the hydrogen introduction portion 111, or such that the thicknesses of the inner wall 112 and the outer wall 113 are gradually increased toward each other with increasing distance from the hydrogen introduction portion 111.

Figure 7:
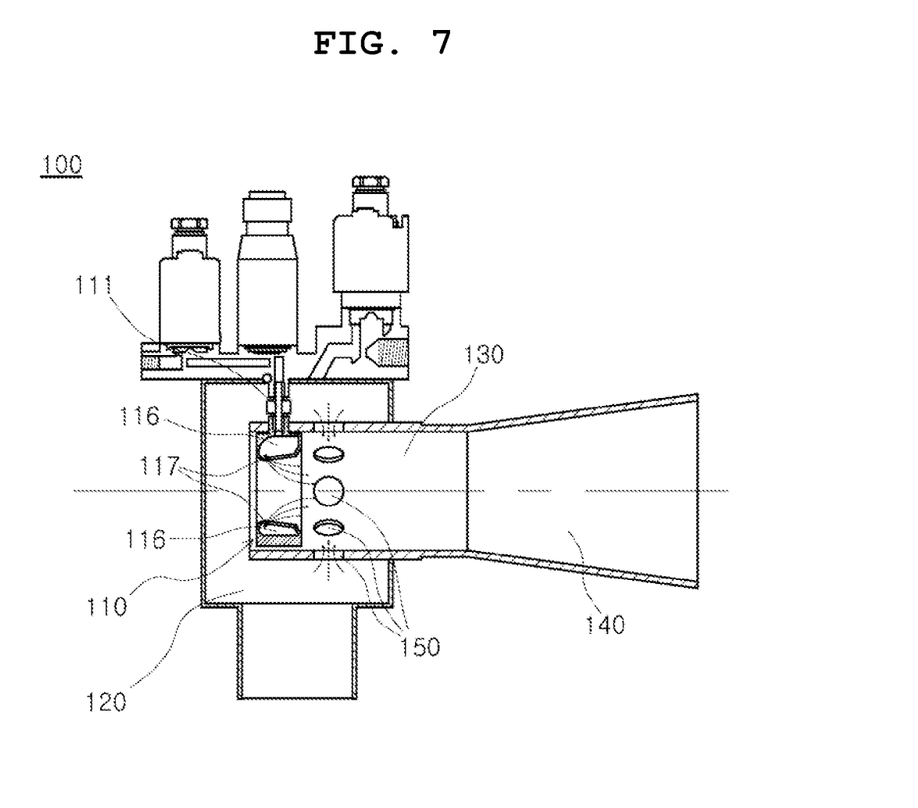
FIG. 7 is a reference view showing the state in which the nozzle of the hydrogen recirculation ejector for fuel cells according to the embodiment of the present invention is inserted into and installed in an inlet of a venturi tube.

Referring to FIG. 7, the nozzle 110 may be optionally inserted into and installed in an inlet of the venturi tube 130.

In this case, it is preferable for a plurality of recirculated hydrogen introduction holes 150 configured to allow recirculated hydrogen to be introduced into the venturi tube therethrough to be formed at the inlet of the venturi tube 130, and it is preferable for the recirculated hydrogen introduction holes 150 to be disposed around the inlet of the venturi tube 130 at equal intervals.

As is apparent from the above description, a hydrogen recirculation ejector for fuel cells according to the present invention has the following effects.

A nozzle configured to eject hydrogen is formed so as to have an airfoil structure, whereby it is possible to improve hydrogen recirculation performance in the entire output area of a fuel cell system.

In addition, since the nozzle configured to eject hydrogen is formed so as to have an airfoil structure, it is possible to achieve higher hydrogen supply efficiency than conventionally.

Although the present invention has been described with reference to the embodiments shown in the drawings, the embodiments are merely illustrations, and those skilled in the art will appreciate that various modifications and equivalents are possible therefrom. Accordingly, the true technical protection scope of the present invention should be defined by technical idea set forth in the appended claims.

What is claimed is:

1. A hydrogen recirculation ejector for fuel cells, the hydrogen recirculation ejector comprising:
   a recirculation line configured to recirculate residual hydrogen gas discharged from a fuel cell stack configured to generate electricity using air and hydrogen gas supplied thereto to an inlet of the fuel cell stack; and
   an ejector comprising a nozzle installed on the recirculation line, the nozzle being configured to supply new hydrogen gas, a venturi tube configured to mix the supplied new hydrogen gas from the nozzle and the recirculated residual hydrogen gas with each other, and a diffuser configured to supply the mixed hydrogen gases to the fuel cell stack, wherein
   the nozzle is inserted into and installed in an inlet of the venturi tube, and the nozzle comprises:
   a hydrogen introduction portion configured to allow hydrogen supplied from a hydrogen tank to be introduced into the nozzle therethrough;
   a ring-shaped inner wall provided so as to define a bore configured to eject hydrogen;
   a ring-shaped outer wall spaced apart from the ring-shaped inner wall in an outward direction, the ring-shaped outer wall being provided so as to define a hydrogen flow path configured to allow the hydrogen introduced through the hydrogen introduction portion to flow therealong;
   a ring-shaped front end wall provided so as to connect front ends of the ring-shaped inner wall and the ring-shaped outer wall to each other, the front end wall being configured to block a front end of the hydrogen flow path; and
   a ring-shaped rear end wall extending from a rear end of the ring-shaped outer wall to the front end of the ring-shaped inner wall, the rear end wall being provided such that a hydrogen ejection port is defined between the rear end wall and the ring-shaped inner wall, and wherein
   a thickness of at least one of the ring-shaped inner wall and the ring-shaped outer wall is gradually increased with increasing distance from the hydrogen introduction portion such that a sectional area of the hydrogen flow path is gradually reduced with increasing distance from the hydrogen introduction portion, and
   wherein the venturi tube is provided at the inlet thereof with a plurality of recirculated hydrogen introduction holes configured to allow the recirculated hydrogen to be introduced into the venturi tube therethrough.

2. The hydrogen recirculation ejector according to claim 1, wherein the thickness of the ring-shaped inner wall is gradually increased in a direction toward the ring-shaped outer wall with increasing distance from the hydrogen introduction portion.

3. The hydrogen recirculation ejector according to claim 1, wherein the thickness of the ring-shaped outer wall is gradually increased in a direction toward the ring-shaped inner wall with increasing distance from the hydrogen introduction portion.

4. The hydrogen recirculation ejector according to claim 1, wherein the thicknesses of the ring-shaped inner wall and the ring-shaped outer wall are gradually increased toward each other with increasing distance from the hydrogen introduction portion.

5. The hydrogen recirculation ejector according to claim 1, wherein the plurality of recirculated hydrogen introduction holes are disposed around the inlet of the venturi tube at equal intervals.

6. The hydrogen recirculation ejector according to claim 1, wherein the nozzle is manufactured by three-dimensional (3D) printing.

* * * * *